US011841865B2

(12) United States Patent
Basu (10) Patent No.: US 11,841,865 B2
(45) Date of Patent: Dec. 12, 2023

(54) DATABASE MANAGEMENT SYSTEM AND ASSOCIATED METHODS

(71) Applicant: Smiths US Innovation LLC, Fremont, CA (US)

(72) Inventor: Samit K. Basu, Fremont, CA (US)

(73) Assignee: John Crane UK, Limited, Slough (GB)

( * ) Notice: Subject to any disclaimer, the term of this patent is extended or adjusted under 35 U.S.C. 154(b) by 0 days.

(21) Appl. No.: 18/048,555

(22) Filed: Oct. 21, 2022

(65) Prior Publication Data

US 2023/0267123 A1 Aug. 24, 2023

Related U.S. Application Data

(60) Provisional application No. 63/268,226, filed on Feb. 18, 2022.

(51) Int. Cl.
*G06F 16/2457* (2019.01)
*G06F 16/22* (2019.01)

(52) U.S. Cl.
CPC ........ *G06F 16/2457* (2019.01); *G06F 16/221* (2019.01); *G06F 16/2219* (2019.01)

(58) Field of Classification Search
CPC . G06F 16/2457; G06F 16/221; G06F 16/2219
See application file for complete search history.

(56) References Cited

U.S. PATENT DOCUMENTS

| | | | | |
|---|---|---|---|---|
| 9,398,053 | B2* | 7/2016 | Kallstrom | H04L 67/06 |
| 10,853,373 | B1* | 12/2020 | Bhatia | G06F 16/24568 |
| 2005/0289007 | A1* | 12/2005 | Glebe | G06Q 10/087 |
| | | | | 705/28 |
| 2013/0138613 | A1* | 5/2013 | Paulzagade | G06F 11/1451 |
| | | | | 707/E17.005 |
| 2017/0192414 | A1* | 7/2017 | Mukkamala | H04L 43/045 |
| 2021/0042658 | A1* | 2/2021 | Sainani | G06F 16/248 |
| 2022/0398243 | A1* | 12/2022 | Beedgen | G06F 17/40 |

\* cited by examiner

*Primary Examiner* — Etienne P Leroux
(74) *Attorney, Agent, or Firm* — Saul Ewing LLP; Brian R. Landry (57) ABSTRACT

A system includes computer-readable media having memory, one or more processors, and instructions in the memory that, when executed by the one or more processors, cause the processor(s) to: generate an archive container, a cooked container, an ingest container, and an index container; receive, in the ingest container, a plurality of time series data elements; identify a data format for each of the time series data elements; divide the plurality of time series data elements into a plurality of data sub-elements based on a corresponding append binary large objects (blobs) contained in the cooked container; generate, statistical data for the plurality of time series data elements for each of one or more index blobs contained in the index container; and output: the statistical data to the index container; the plurality of data sub-elements to the cooked container, and the plurality of time series data elements to the archive container.

15 Claims, 6 Drawing Sheets

FIG. 1

| Name | Access Tier | Access Tier Last Modified | Last Modified | Blob Type | Content Type | Size | Status |
|---|---|---|---|---|---|---|---|
| ae_de_seal_ae::kurtosis.csv.gz | | | 3/15/2021, 11:01:16 AM | Append Blob | application/octet-stream | 35.7 KB | Active |
| ae_de_seal_ae::rms_mv.csv.gz | | | 3/15/2021, 11:01:57 AM | Append Blob | application/octet-stream | 40.5 KB | Active |
| ae_de_seal_ae::rms_order_1_mv.csv.gz | | | 3/15/2021, 11:01:38 AM | Append Blob | application/octet-stream | 41.4 KB | Active |
| ae_de_seal_ae::rms_order_2_mv.csv.gz | | | 3/15/2021, 11:01:39 AM | Append Blob | application/octet-stream | 42.2 KB | Active |
| ae_de_seal_ae::rms_order_3_mv.csv.gz | | | 3/15/2021, 11:00:51 AM | Append Blob | application/octet-stream | 43.1 KB | Active |
| ae_de_seal_ae::rms_order_4_mv.csv.gz | | | 3/15/2021, 11:01:39 AM | Append Blob | application/octet-stream | 44.0 KB | Active |
| ae_nde_seal_ae::kurtosis.csv.gz | | | 3/15/2021, 11:01:57 AM | Append Blob | application/octet-stream | 32.3 KB | Active |
| ae_nde_seal_ae::rms_mv.csv.gz | | | 3/15/2021, 11:01:14 AM | Append Blob | application/octet-stream | 38.5 KB | Active |
| ae_nde_seal_ae::rms_order_1_mv.csv.gz | | | 3/15/2021, 11:01:13 AM | Append Blob | application/octet-stream | 39.1 KB | Active |
| ae_nde_seal_ae::rms_order_2_mv.csv.gz | | | 3/15/2021, 11:00:50 AM | Append Blob | application/octet-stream | 39.9 KB | Active |
| ae_nde_seal_ae::rms_order_3_mv.csv.gz | | | 3/15/2021, 11:02:09 AM | Append Blob | application/octet-stream | 40.7 KB | Active |
| ae_nde_seal_ae::rms_order_4_mv.csv.gz | | | 3/15/2021, 11:01:39 AM | Append Blob | application/octet-stream | 41.7 KB | Active |
| ae_pump_ae::kurtosis.csv.gz | | | 3/15/2021, 11:02:09 AM | Append Blob | application/octet-stream | 35.7 KB | Active |
| ae_pump_ae::rms_mv.csv.gz | | | 3/15/2021, 11:01:57 AM | Append Blob | application/octet-stream | 38.7 KB | Active |
| ae_pump_ae::rms_order_1_mv.csv.gz | | | 3/15/2021, 11:01:39 AM | Append Blob | application/octet-stream | 39.2 KB | Active |
| ae_pump_ae::rms_order_2_mv.csv.gz | | | 3/15/2021, 11:01:13 AM | Append Blob | application/octet-stream | 40.3 KB | Active |
| ae_pump_ae::rms_order_3_mv.csv.gz | | | 3/15/2021, 11:01:57 AM | Append Blob | application/octet-stream | 41.0 KB | Active |

FIG. 2

| Name | Access Tier | Access Tier Last Modified | Last Modified | Blob Type | Content Type | Size | Status |
|---|---|---|---|---|---|---|---|
| ae_pump_ae::kurtosis.bin | | | 3/15/2021, 7:02:06 PM | Page Blob | application/octet-stream | 8.6 MB | Active |
| ae_pump_ae::rms_mv.bin | | | 3/15/2021, 7:02:16 PM | Page Blob | application/octet-stream | 8.6 MB | Active |
| ae_pump_ae::rms_order_1_mv.bin | | | 3/15/2021, 7:02:09 PM | Page Blob | application/octet-stream | 8.6 MB | Active |
| ae_pump_ae::rms_order_2_mv.bin | | | 3/15/2021, 7:02:23 PM | Page Blob | application/octet-stream | 8.6 MB | Active |
| ae_pump_ae::rms_order_3_mv.bin | | | 3/15/2021, 7:02:10 PM | Page Blob | application/octet-stream | 8.6 MB | Active |
| ae_pump_ae::rms_order_4_mv.bin | | | 3/15/2021, 7:02:23 PM | Page Blob | application/octet-stream | 8.6 MB | Active |
| ae_seal_ae::kurtosis.bin | | | 3/15/2021, 7:02:06 PM | Page Blob | application/octet-stream | 8.6 MB | Active |
| ae_seal_ae::rms_mv.bin | | | 3/15/2021, 7:02:28 PM | Page Blob | application/octet-stream | 8.6 MB | Active |
| ae_seal_ae::rms_order_1_mv.bin | | | 3/15/2021, 7:02:23 PM | Page Blob | application/octet-stream | 8.6 MB | Active |
| ae_seal_ae::rms_order_2_mv.bin | | | 3/15/2021, 7:02:06 PM | Page Blob | application/octet-stream | 8.6 MB | Active |
| ae_seal_ae::rms_order_3_mv.bin | | | 3/15/2021, 7:02:15 PM | Page Blob | application/octet-stream | 8.6 MB | Active |
| ae_seal_ae::rms_order_4_mv.bin | | | 3/15/2021, 7:02:09 PM | Page Blob | application/octet-stream | 8.6 MB | Active |
| barrier_buffer_in_degree_c.bin | | | 3/15/2021, 7:02:06 PM | Page Blob | application/octet-stream | 8.6 MB | Active |
| barrier_buffer_out_degree_c.bin | | | 3/15/2021, 7:02:06 PM | Page Blob | application/octet-stream | 8.6 MB | Active |
| barrier_buffer_pressure_bar.bin | | | 3/15/2021, 7:02:06 PM | Page Blob | application/octet-stream | 8.6 MB | Active |
| conf.json.bin | | | 3/15/2021, 7:00:12 PM | Page Blob | application/octet-stream | 8.6 MB | Active |

DATABASE MANAGEMENT SYSTEM AND ASSOCIATED METHODS

CROSS-REFERENCE TO RELATED APPLICATION

This application claims the benefit of priority under 35 U.S.C. § 119(e) to U.S. Provisional Patent Application Ser. No. 63/268,226, filed Feb. 18, 2022. The entire content of this application is hereby incorporated by reference herein.

BACKGROUND OF THE INVENTION

Data indexing systems can receive, store, and retrieve data from various computing entities. High-volume data systems, such as those involving Internet of Things (IoT) networks, can require high-volume ingestion and storage capabilities, as well as the ability to receive high data volume from numerous sources, and the ability to scale quickly and efficiently.

SUMMARY OF THE INVENTION

One aspect of the invention provides a database management system including computer-readable media having memory, one or more processors, and instructions stored in the memory that, when executed by the one or more processors, cause the one or more processors to: generate an archive container, a cooked container, an ingest container, and an index container; receive, in the ingest container, a plurality of time series data elements as input; identify, in the ingest container, a data format for each of the plurality of time series data elements; divide, in the ingest container, the plurality of time series data elements into a plurality of data sub-elements based on a corresponding append binary large objects (blobs) contained in the cooked container; generate, in the ingest container, statistical data for the plurality of time series data elements for each of one or more index blobs contained in the index container; and output, from the ingest container: the statistical data to the index container; the plurality of data sub-elements to the cooked container, and the plurality of time series data elements to the archive container.

This aspect of the invention can have a variety of embodiments. The instructions can be further executable to generate the statistical data based on a predefined time cycle.

The statistical data can include a minimum value within the plurality of time series data elements, a maximum value within the plurality of time series data elements, a mean value of the plurality of time series data elements, a count value of the plurality of time series data elements, or a combination thereof.

The statistical data can include data corresponding to a data type of the respective index blob.

The database management system can further include a query application programming interface adapted or configured to: transmit a query corresponding to data stored in the archive container, the cooked container, the index container, or a combination thereof, to the respective archive container, cooked container, index container, or combination thereof; and receive the requested data in response to the query.

The plurality of time series data elements can be received from one or more Internet of Things (IoT) devices.

The plurality of sub-elements can be stored in a columnar format. The plurality of sub-elements can be stored in a compressed comma separated variables (CSV) format.

The plurality of time series elements can be stored in the archive container as raw data.

The plurality of sub-elements can each include time data and device identification data. Each of the plurality of sub-elements can be stored in the corresponding append blob based on the device identification data, the time data, or both.

The archive container, the cooked container, and the index container can include a data lake.

The plurality of time series data elements can be received non-chronologically.

Two or more of the plurality of sub-elements can be stored simultaneously and independently from each other.

Data can be received non-chronologically, but immediately searchable.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIG. 2 depicts a data chart contained in a cooked container of a database management system according to an embodiment of the present disclosure.

FIG. 4 depicts a data chart contained in an archive container of a database management system according to an embodiment of the present disclosure.

Definitions

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Database Management System

Database management systems and associated methods are described herein. The database management system can include an ingest container, a cooked container, and an archive container. The system can receive data from a data source, such as an Internet of Things (IoT) device, process the data, and store both the processed and raw data. The ingest container can receive the data, process the data, and route the data to its associated storage container. The raw data can be compressed independently and stored in the archive container, which can allow the system to provide parallel updates to the same time series, and out-of-order ingestion of data. Processed data can be processed and stored in the cooked container, where the processed data can be stored in a columnar format. The index container can store an index of aggregate data, which can allow user interfaces (UIs) and apps to quickly retrieve large longitudinal amounts of data binned at regular intervals.

The database management system can provide for multiple benefits, including:

| | |
|---|---|
| High Performance | Longitudinal queries are fast, for example, on the order of seconds for data queries. This requires either extraordinary computing resources (which is expensive), or data reformatting and storage using a columnar architecture as described herein. The database management system relies on a columnar store for data, which provides excellent query performance for longitudinal queries. |
| Raw Data Access | Applications having access to the index engine stored data have free access to the raw data. A frequent use case is to retrieve all raw data from a particular device over a predefined period of time. |
| Scalability | The database management system described herein has successfully supported 100 Harrier systems on a single instance of the engine. Under this test, the database management system successfully ingested 100 data messages/second for 24 hours, 7 days a week. No other engine solution in the field are capable of supporting this volume of data ingestion. |
| Data Immutability | Most IoT telemetry and SAAS providers treat data as mutable. Mutable data allows for apps and user to "clean" the data, but carries the risk of data loss. The data stored by the database management system described herein is treated as immutable, but the data can be "revised" at any time. Revised data allows data values to be changed in a query, but previous data values are still available for forensics or data recovery. |
| Non-Chronological Ingestion | The database management system can support non-chronological data ingestion. For example, the database management system can ingest data in any order and in parallel. While some of the mechanisms may perform as well with non-chronological queries, the raw ingestion and indexing can proceed with no loss of data. |
| Ease of Use | The consumers of database management systems generally use high-level data processing tools like PYTHON or GRAFANA to interact with the data. These provide very simple interfaces for fetching and "brushing" (writing) data into the DB. |
| Data Portability | The database management system described herein allows for complete transparency into the data state and can be moved or copied using standard data lake tools. |
| Transparency | The database management system described herein can include a maximally transparent architecture. The goal of transparency is to provide visibility into what data is stored where and how. Transparency is typically sacrificed in the name of performance or proprietary needs, for example, for SAAS and PAAS solutions. |
| Self-Describing | the notion of self describing is critical in software and data architectures. Essentially, it means given an instance of a FP setup, can a user determine what data is stored? For how long? What values? Which features were "original"? Which ones were added? Who "owns" each time series (customer/site/asset/etc). SAAS solutions tend to have descriptors (typically generated during the "setup period"). But these are not standardized, and are typically not shared back with the user. |
| Secure | The database management system described herein can handle data encrypted in transit and at rest. In some cases, keys to the API can be revocable. Access to a FP instance can be controllable using IP range restrictions and other firewall settings. |

The database management system described herein can include a data lake, and serverless functions, which will be described in more detail below.

Data Lake

The database management system 100 can include a data lake 105, or blob storage. The performance of the database management system 100 (latency, throughput, redundancy, scalability, and the like) may be derived from the properties of the data lake 105. In some cases, the database management system 100 can include a standard data lake, which can provide various storage types and are targeted at general purpose applications and use. In some cases, the database management system 100 can include a premium data lake, which can provide higher performance, but a limited mechanism for accessing and storing data.

The data lake 105 can be implemented in a particular manner by the database management system 100. For example, data can be broken down into blobs (blocks) that are indexed based on a transmitting device and time. For example, a temperature reading from device X at time Y can be written to a blob named X::Y::temperature. In some cases, the time Y can be broken to the nearest hour, for example, X::year::month::day::hour::temperature.

Raw data can be written in a compressed format. For example, the raw data can be written in a compressed Comma Separated Variables (CSV) format. Each time series stored in the database management system 100 can include the same format for representation on disk. The data can be persisted as a CSV with two or more columns (e.g., timestamp and value). Because the data can be written in a series of append operations, each block of data can be compressed independently, which allows for parallel updates to the same time series and out-of-order ingestion. In some cases, AZURE Append Blobs can be implemented for these writes, since they provide the ability to append a number of smaller writes into a single monolithic entity.

Index data can be written in compressed CSV form to Page Blobs. Each page of the blob can be accessed and retrieved or updated independently. The database management system 100 can store the aggregate data in the index, using a predefined time scale (e.g., 5 minutes, 10 minutes, and the like). Thus, the data in the index can be available on the time scale resolution, and can contain statistics for all samples within a predefined time period (e.g., one hour, two hours, and the like). For example, the statistics can include a minimum value, a maximum value, a mean value, a count value, and the like, for the samples within the predefined time period. Further, in some cases, the index size can remain constant, regardless of the amount of raw data is ingested at any given time.

Ingestion of data can be via a designated container. Any data dropped into this container can be ingested into the container database. In some cases, the ingestion can be file-based, which can provide sufficient performance at scale.

Indices can be maintained as CSV files. These files can be used to record metadata, such as customer, side, and asset information, as well as installation notes of the transmitting device, and the like. These additional factors can be used to form the structure of data queries supported through the REST API. For example, inquiries can be structured as "provide a list of all data collected for customer X, site Y, and asset Z," which may be dependent on the metadata stored from the transmitting devices.

Other characteristics of the database management system 100 can be based on the data lake. Replication, backups, multi-site storage, geo-redundancy, encryption of data, and fundamental limits can be according to the limits/characteristics of the underlying data lake 105. Data scalability can be provided through horizontal scaling. For example, with a design target of 200 HARRIER systems per database management system instance, supporting 1,000 such systems (e.g. which may generate approximately 250 TB of data per month) would require five backing data lakes. There may be no limit on such scaling, apart from budget concerns.

Ingest Container

The database management system 100 can include an ingest container 110. Data written to this container 110 can be ingested, processed, and transferred out. Visual inspection of the content of the ingest container 110 can provide insight into the processing backlog, health of the ingestion engine, any rejected or non-conforming data, and the like (e.g., as depicted in FIG. 2). In a steady-state condition, the ingest container 110 can be empty, or contain a few minute's worth (e.g., 2 minute, 5 minute, and the like) of data.

Cooked Container

Figure 3:
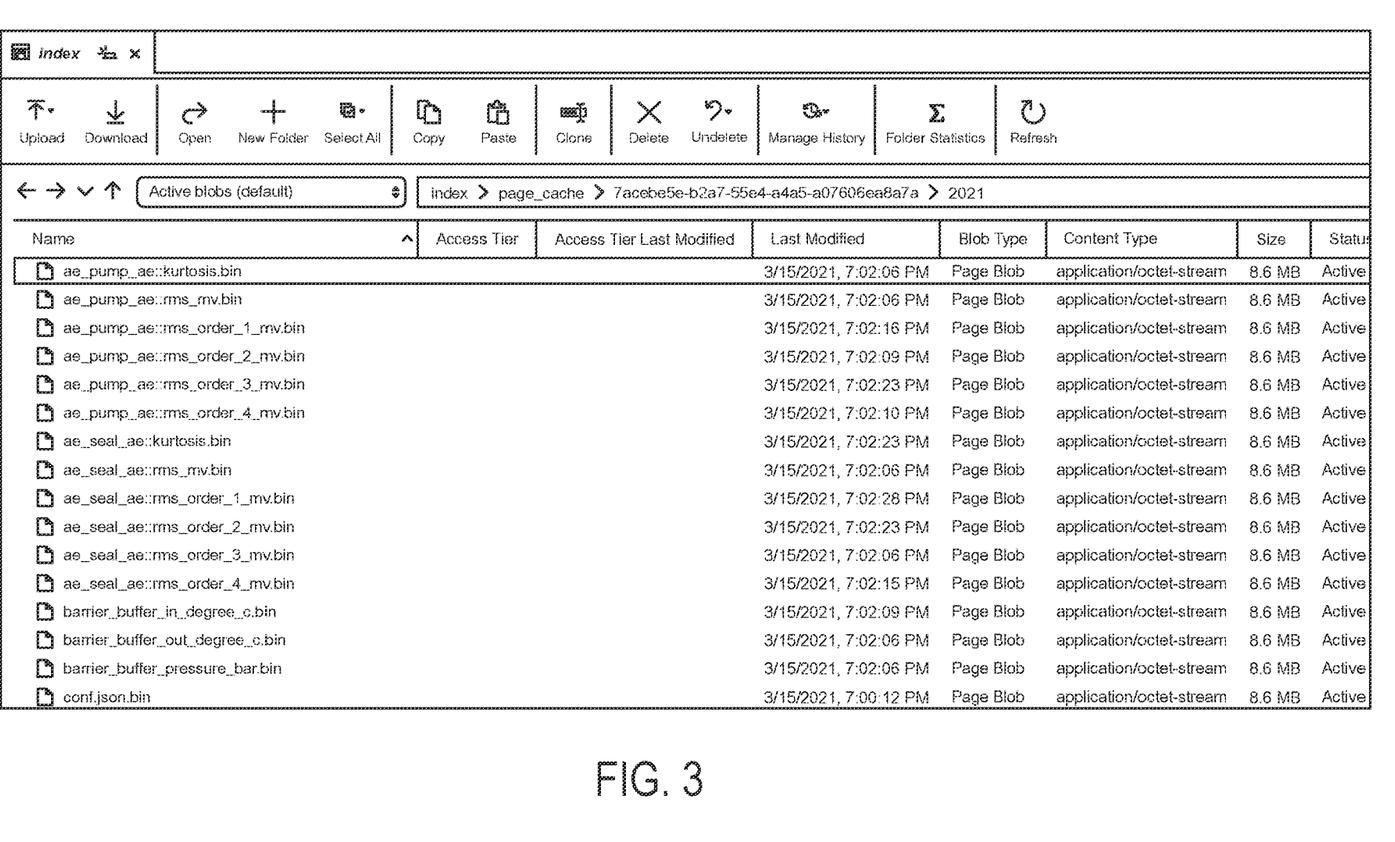
FIG. 3 depicts a data chart contained in an index container of a database management system according to an embodiment of the present disclosure.

The database management system 100 can also include a cooked container 115. Time series data can be written to the cooked container 115. The cooked container 115 can include a set of append blobs, each of which contain a name for written data. For example, an append blob can include the name device::year::month::day::hour::tsid. Each time series can be written in a compressed CSV formatted blob with the appends independently compressed. Further, in some cases, special tools may not be required to read the written data; access to the DL can be sufficient for reading the data using standard data-lake protocols. This may allow for the database management system to be compatible with other data-science tolling and machine-learning infrastructure. FIG. 3 depicts data organized in a cooked container of the database management system.

Index Container

The database management system 100 can also include an index container 120. The index container 120 can house index blobs, for example one blob per device-year time-series. For example, if a device X sends data in 2019 for timeseries temperature, the index container can include an index blob named X::2019::temperature. Each index blob can include a series of tightly compressed summary statistics (e.g., a 1 KB block of compressed data). The tight compression can allow for potential future expansion to include additional aggregations (e.g., standard deviation, median metrics, and the like). The index container 120 can also include a master index list, which can provide information on customer, site, asset, and the like, for each device. The master index list can also contain Cartesian products of the master index with a list of timeseries. The data contained in the index container can be computed on a predefined time scale (e.g., every 5 minutes, every 10 minutes, and the like) can be accessed by user interface queries (e.g., via GRAFANA, and the like). FIG. 4 depicts data organized in an index container of the database management system.

Archive Container

Figure 5:
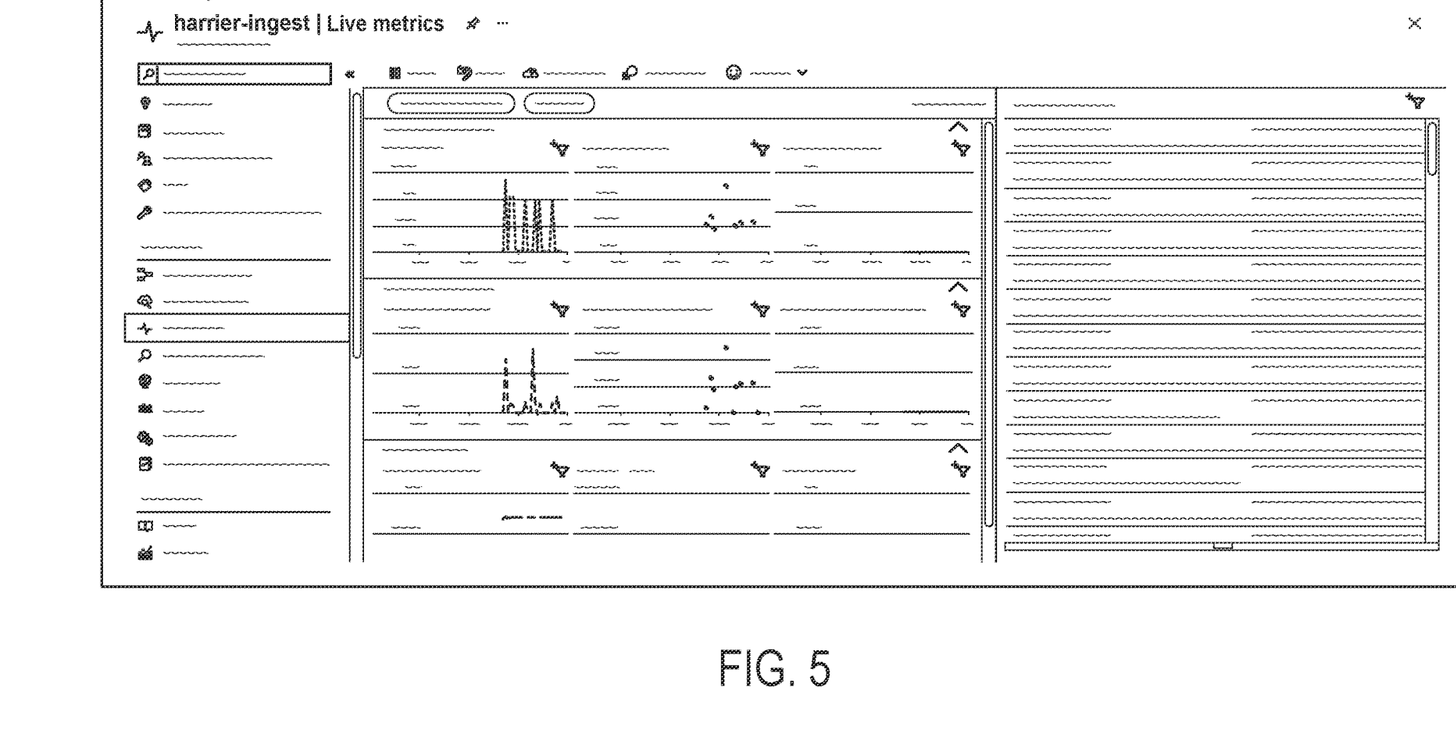
FIG. 5 depicts a metrics display for an ingest serverless function of a database management system according to an embodiment of the present disclosure.

The database management system 100 can also include an archive container 125. The archive container 125 can include blobs successfully ingested by the database management system. Once a data element is successfully processed, the data can be transferred to the archive container 125, where it is stored for future use. The archive container 125 provides an archive capability that is typically conducted by another data lake or storage account. FIG. 5 depicts data organized in an archive container of the database management system.

Ingest Function

The database management system 100 can implement certain serverless functions. For example, the database management system 100 can employ an ingest function 130. The ingest function 130 can be custom to each function type, and can interpret data being delivered to the ingest container. The ingest function 130 can interpret the data format, apply any calibrations and/or corrections, and then output the data. The output process can involve splitting a time series up into individual steams, appending them to the corresponding blobs (or creating new ones), and then recreating the index. In some cases, the ingest function 130 can be customized for each application.

Ingest API

Figure 6:
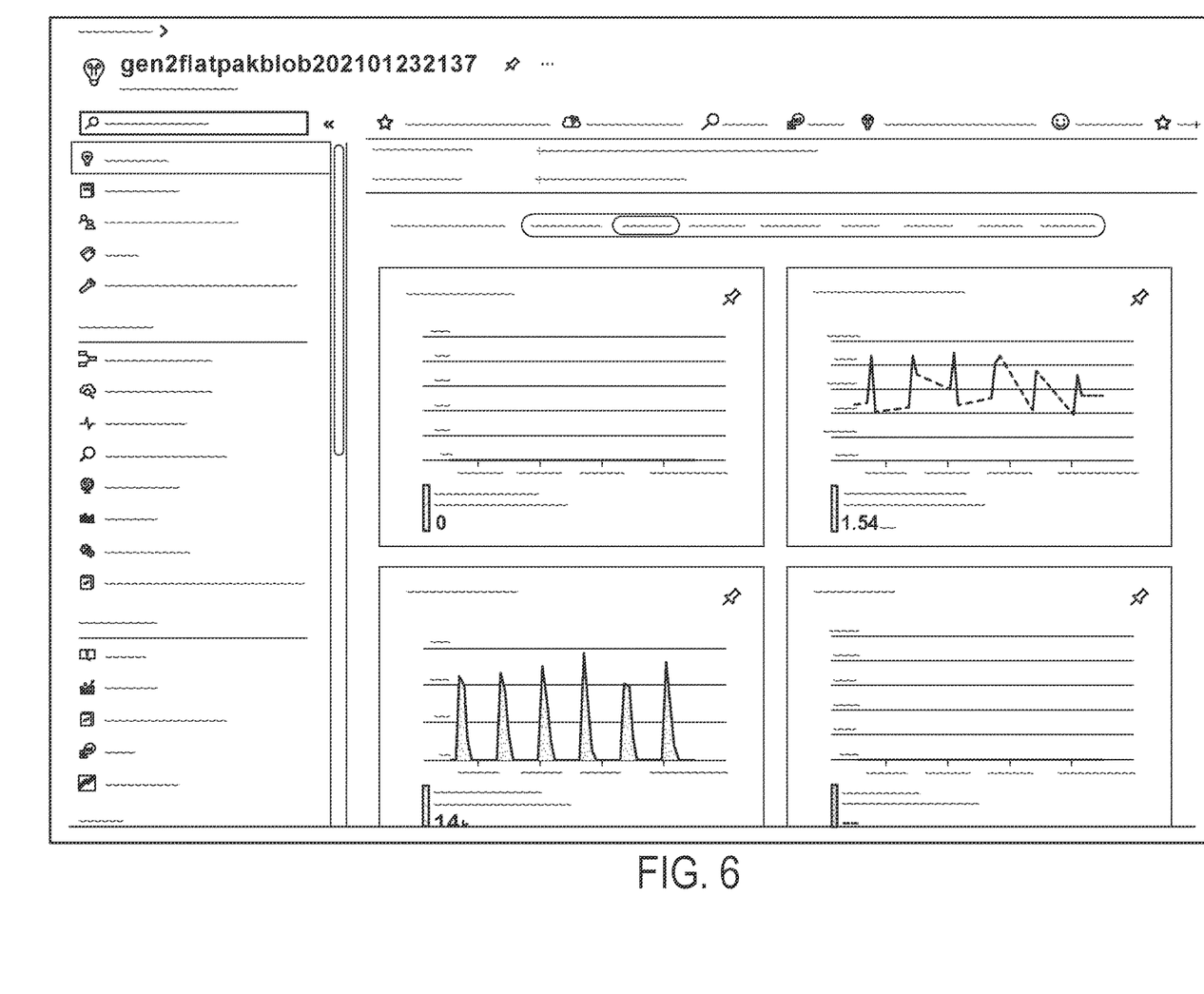
FIG. 6 depicts a metrics display for a REST API serverless function of a database management system according to an embodiment of the present disclosure.

Another serverless function can include the ingest application programming interface (API) 135. The ingest API 135 can be the interface between the database management system 100 and the transmitting devices, as well as the interface between the database management system 100 and querying devices (e.g., for data inspection). The ingest API 135 can implement smart caching so that access patterns can be identified, and thus future access can become faster over time. FIG. 6 depicts a dashboard view of an ingest API for an database management system.

The database management system 100 can thus store an index of aggregate data (max, min, mean, count, and the like) over a predefined time interval. This can allow apps and UIs to quickly retrieve large longitudinal amounts of data binned at the time interval. The aggregated data is stored in blobs (e.g., one per timeseries). The index can automatically be created and updated during ingestion.

The database management system 100 can also store metadata that can contextualize the time series information for future queries and visualization. The mapping from device X to customer A, site B, asset C can be accomplished by a CSV file that can be edited with editing programs (e.g., EXCEL, and the like). When the number of devices/assets becomes large, the file can be autogenerated by running queries against other systems holding the data.

Data Flow Process

Figure 1:
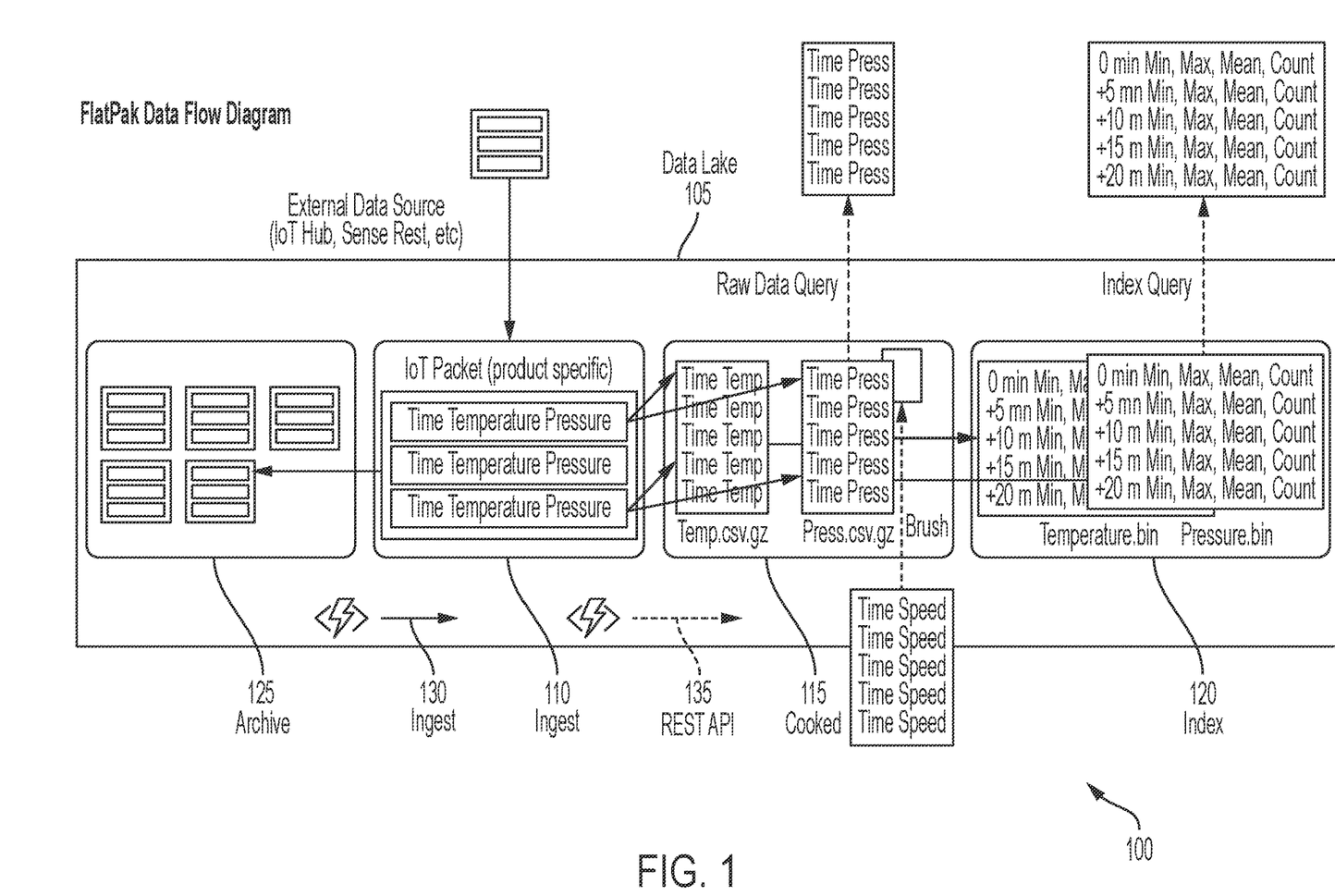
FIG. 1 depicts a data flow for a database management system according to an embodiment of the present disclosure.

FIG. 1 depicts a data flow diagram for a database management system according to an embodiment of the present disclosure. As discussed above with reference to the database management system, the database management system can include a data lake, which can further include an archive container, an ingest container, a cooked container, and an index container.

The index engine can receive wireless communications from an external data source, which can be one of a plurality of various external data sources. For example, the external data source can be an IoT device, which can communicate data over regular (synchronous) or intermittent (asynchronous) time periods. The index engine can receive one of these communications, and can ingest the communication (via the ingest function), which can include identifying the data format of the received communication, applying any calibrations or corrections to the data, and then output the data to any other corresponding container. For example, the data can be outputted to the archive container, the cooked container, and/or the index container.

The archive container can receive the data from the ingest container and can store the data in a raw format. The cooked container can receive processed data from the ingest container and can write the data to the container. The data can be stored in the cooked container in a corresponding append blob. For example, the data from the communication can be stored in an append blob for that given device and that given predefined time scale. Further, the cooked container can be implemented for responding to a data query (e.g., as facilitated by the ingest API), for example from an external user device having access to the database management system.

The index container can receive processed data (e.g., from the ingest container), and can write particular statistics corresponding to the processed data. For example, the index container can include index blobs, which can correspond to the device identity from which the communication was received, a time period for receiving the communication, and the type of sensing data provided by the communication (e.g., temperature readings). Each index blob can include statistics for the data stored for that given blob. For example, a given index blob can include statistics such as mean, median, maximum, minimum, and count values for the pieces of data stored the given index blob. The index container can be implemented for index queries (e.g., facilitated by the ingest API), that are received from a user device. For example, an index query can request statistics corresponding to a given device over a period of time, which the database management system can respond with particular statistics (max, min, median, etc.).

Example 1

The database management system can be written in RUST, a high performance, memory safe and concurrent language used for critical applications in the embedded and infrastructure spaces.

REST API

The ingest API can rely on core RUST components, including:

| | |
|---|---|
| flatpak-rest-api-rs | This is the function that provides the ingest API, used by the APPS and by GRAFANA. |
| azure_blob_rs | This library provides an abstraction layer to access the AZURE DataLake via it's ingest API. It provides a number of the key implementation details needed to achieve high performance and durable/reliable performance, including exponential retry and backoff logic, error handling, etc. |
| flatpak-lib-rs | This provides the common libraries to handle time series manipulation, index creation and updating, statistical feature calculation, etc. It is product agnostic. |

Ingestion

The ingest code can be product specific, and each product can include its own set of dependencies. For example, the dependencies implemented by CONDOR (vibration monitoring) can include:

| | |
|---|---|
| condor-flatpak-ingest-rs | This is the top level compute function used to provide ingest capability for CONDOR data streams. |
| condor_vibration_lib_rs | This is a set of analysis functions (written in RUST) that provide spectral analysis, acceleration to velocity conversion, filtering, etc. for vibration data. |
| azure-custom-rs | This is a generic set of helper functions and data structures to deploy RUST functions in AZURE. |
| flatpak-lib-rs | This is the core database management system library, used by both the ingestion and ingest API engines. |
| condor_flatpak_bridge | Each product has a bridge library where details of how the data should be interpreted, processed, etc. are stored. These are kept out of the ingest function itself and kept in a library that can be easily extended and tested. |
| flatpak_write_cache | This allows the database management system to take large numbers of small atomic writes, and group them into a small number of larger updates and writes. |

URL Scheme

The database management system API can be hosted as an AZURE Function Object. All calls are to URLs of the type
 <hostname>/api/v1/{verb}
where verb is used to distinguish the type of query or process.

Security

The ingesting engine API is secured on AZURE using an API key. The API key can be passed in the HTTPS headers for AZURE to allow the call to take place. This is done by specifying:
 x-functions-key: <API key>
 Requests (PYTHON) can be accomplished by:
 import requests
 url='https://flatpak.azure.windows.net/api/v1/search'
   *Just an example, not real
 headers={'x-functions-key': 'api key goes here'}
 r=requests.get(url, headers=headers)

Search

The ingest API includes a search function. The search function operates like a dropdown in a GUI. A user enters a search string and receives a list of all TSIDs (Time Series Identifiers) that match that search function. This is a POST operation. The nature of the search is simply a substring (case insensitive) of the TSIDs the user seeks To do a search, POST a JSON-encoded struct such as the following can be used:
 {"target": "pattern"}
Where "expression" is the substring you want to match. For example, if one has a device ID, a search for that device ID will return all time series IDs in the database management system that match that device ID. For example:
 #!/bin/sh
 curl-XPOST-H "x-functions-key: <apikey>"--header
 "Content-Type: application/json"
 https://gen2flatpakblob.azurewebsites.net/api/v1/search
returns:
 [
  "Oxy::LaPorte::GA-2282S::aaffbaa3-58d7-5ede-ab8f-33d81cee816c::ae_pump_ae::kurtosis::min", "Oxy::LaPorte::GA-2282S::aaffbaa3-58d7-5ede-ab8f-33d81cee816c::ae_pump_ae::kurtosis::mean",
  "Oxy::LaPorte::GA-2282S::aaffbaa3-58d7-5ede-ab8f-33d81cee816c::ae_pump_ae::kurtosis::max",
  "Oxy::LaPorte::GA-2282S::aaffbaa3-58d7-5ede-ab8f-33d81cee816c::ae_pump_ae::kurtosis::count",
  "Oxy::LaPorte::GA-2282S::aaffbaa3-58d7-5ede-ab8f-33d81cee816c::ae_pump_ae::rms_mv::min",
  "Oxy::LaPorte::GA-2282S::aaffbaa3-58d7-5ede-ab8f-33d81cee816c::ae_pump_ae::rms_mv::mean",
  "Oxy::LaPorte::GA-2282S::aaffbaa3-58d7-5ede-ab8f-33d81cee816c::ae_pump_ae::rms_mv::max",
  "Oxy::LaPorte::GA-2282S::aaffbaa3-58d7-5ede-ab8f-33d81cee816c::ae_pump_ae::rms_mv::count",
  "Oxy::LaPorte::GA-2282S::aaffbaa3-58d7-5ede-ab8f-33d81cee816c::ae_pump_ae::rms_order_1_mv::min", "Oxy::LaPorte::GA-2282S::aaffbaa3-58d7-5ede-ab8f-33d81cee816c::ae_pump_ae::rms_order_1_mv::mean", "Oxy::LaPorte::GA-2282S::aaffbaa3-58d7-5ede-ab8f-33d81cee816c::ae_pump_ae::rms_order_1_mv::max", "Oxy::LaPorte::GA-2282S::aaffbaa3-58d7-5ede-ab8f-33d81cee816c::ae_pump_ae::rms_order_1_mv::count", "Oxy::LaPorte::GA-2282S::aaffbaa3-58d7-5ede-ab8f-33d81cee816c::ae_pump_ae::rms_order_2_mv::min", "Oxy::LaPorte::GA-2282S::aaffbaa3-58d7-5ede-ab8f-33d81cee816c::ae_pump_ae::rms_order_2_mv::mean", "Oxy::LaPorte::GA-2282S::aaffbaa3-58d7-5ede-ab8f-33d81cee816c::ae_pump_ae::rms_order_2_mv::max", "Oxy::LaPorte::GA-2282S::aaffbaa3-58d7-5ede-ab8f-33d81cee816c::ae_pump_ae::rms_order_2_mv::count", "Oxy::LaPorte::GA-2282S::aaffbaa3-58d7-5ede-ab8f-33d81cee816c::ae_pump_ae::rms_order_3_mv::min", "Oxy::LaPorte::GA-2282S::aaffbaa3-58d7-5ede-ab8f-33d81cee816c::ae_pump_ae::rms_order_3_mv::mean", "Oxy::LaPorte::GA-2282S::aaffbaa3-58d7-5ede-ab8f-33d81cee816c::ae_pump_ae::rms_order_3_mv::max", "Oxy::LaPorte::GA-2282S::aaffbaa3-58d7-5ede-ab8f-33d81cee816c::ae_pump_ae::rms_order_3_mv::count", "Oxy::LaPorte::GA-2282S::aaffbaa3-58d7-5ede-ab8f-33d81cee816c::ae_pump_ae::rms_order_4_mv::min", "Oxy::LaPorte::GA-2282S::aaffbaa3-58d7-5ede-ab8f-33d81cee816c::ae_pump_ae::rms_order_4_mv::mean", "Oxy::LaPorte::GA-2282S::aaffbaa3-58d7-5ede-ab8f-33d81cee816c::ae_pump_ae::rms_order_4_mv::max", "Oxy::LaPorte::GA-2282S::aaffbaa3-58d7-5ede-ab8f-33d81cee816c::ae_pump_ae::rms_order_4_mv::count", "Oxy::LaPorte::GA-2282S::aaffbaa3-58d7-5ede-ab8f-33d81cee816c::ae_seal_ae::kurtosis::min", "Oxy::LaPorte::GA- 2282S::aaffbaa3-58d7-5ede-ab8f-33d81cee816c::
ae_seal_ae::kurtosis::mean"]

Aggregation and Nomenclature

The TSIDs can be stored based on device ID, plus the time series name. However, the index includes the customer, site and asset information in the index. Also, each TSID can include an aggregation type. The database management system can support multiple aggregation types, including:

| | |
|---|---|
| min | the minimum recorded value over a given time interval |
| max | the maximum recorded value over a given time interval |
| mean | the mean of all values over a given time interval |
| count | the number of values included in the time interval |

With the exception of count, all aggregations only return data for time intervals that include values. The "count" allows one to see where data is stored, and will return 0 if a time interval is empty.

Query (Getting Data)

The query endpoint can be used to fetch actual timeseries data (via aggregation) from the database management system. The query looks like:
{
"range": {
"from": "2016-10-31T06:33:44.866Z", "to": "2016-10-31112:33:44.866Z"
},
"intervalMs": 30000, "targets": [
{"target": "Oxy::LaPorte::GA-2282S::aaffbaa3-58d7-5ede-ab8f-33d81cee816c::ae_seal_ae::kurtosis::min"
{"target": "Oxy::LaPorte::GA-2282S::aaffbaa3-58d7-5ede-ab8f-33d81cee816c::ae_seal_ae::kurtosis::max"
],
"maxDataPoints": 550
}

The Query can be of the Form:
https://gen2flatpakblob.azurewebsites.net/api/v1/query The maxDataPoints can be limited on the server side to 10000 points in a single query. Large queries are likely to fail or timeout. The interval provided can be used to set the sampling of the data for aggregation, unless the from and to dates require finer resolution. For example, if one requests 1000 samples that cover only 0.1 seconds, then the database management system can assume that the user wants 0.1 msec resolution and ignore intervalMs.

The result of executing the above query returns:
[
{
"target": "Oxy::LaPorte::GA-2207A::b2db25fd-a0b3-5407-98f2-e487a209031c::ae_pump::rms_mv::min",
"datapoints": [
[
7.5927,
1604126024865.9998
],
[
7.567715,
1604126324865.9998
],
[
7.563296,
1604126624865.9998
],
[
7.564386,
1604126924865.9998

],
[
7.551391,
1604127224865.9998
],
[
7.557742,
1604127524865.9998
]
]}]

The data can be of the form [value, timestamp], where the Unix timestamp is in milliseconds (i.e., 0 is Jan. 1, 1970 UTC).

Query Aggregated Data with Different Resolution

When using the query endpoint to query aggregated data from the database management system, the resolution of aggregation can be specified in the query by maxDataPoints and intervalMs.

| | |
|---|---|
| maxDataPoints | the database management system uses this value to calculate the histogram bin size for aggregation: bin_size = (end_time − start_time)/maxDataPoints |
| intervalMs | This value can also be used as the histogram bin size for aggregation. |

If the calculated bin size does not equal to intervalMs, whichever smaller can be used by the database management system. If maxDataPoints is greater than 10000, only the first 10000 data points will be returned in some embodiments as shown in the following example.
{
"range": {
"from": '2020-03-20100:00:00.000Z', "to": '2020-03-25100:00:00.000Z',
},
"intervalMs": 4*60*1000,
"targets": [{"target":
"Enterprise::Almeda::820PM18024::63a50aeb-0035-586d-8b7f-5b9670405b03"
"::de_seal_temperature_degree_c::mean",
"type": "timeserie"}],
"maxDataPoints": 5000
}

In this example, intervalMs is set to be 4 minutes, but "maxDataPoints" asks for a 5*24*60/5000=86.40 s interval. So the database management system can use the smaller interval, which is 86.40 s, as the bin size to aggregate data. If a user needs a 4-minute interval instead, a user can set maxDataPoints to 5*24*(60/4)=1800.

The default aggregation resolution in the database management system can 5 minutes. Anything more coarse than this should return a result almost instantly from the cache. For finer resolution, the database management system can fetch the raw data and re-do aggregation on the fly, so it may take longer. There's no restriction on the length of the time range, but the longer time period requested, the more time you might need to wait.

Raw Data

A user can retrieve Raw data from the database management system using the raw endpoint. To use it, a user can make a POST to the url:
https://gen2flatpakblob.azurewebsites.net/api/v1/raw The body of the post can look like this:
{
"start time": "2020-10-31T06:00:00Z", "end time": "2020-10-31T06:00:30Z",
"device": "b2db25fd-a0b3-5407-98f2-e487a209031c",
"tsid": "ae_pump::rms_mv"
}

In this case, the query will retrieve all data between the two end points, sort then chronologically and deduplicate them. The result is JSON encoded as a pair of arrays in a struct:
{
"timestamps": ["2020-10-31T06:00:00.060436+00:00", "2020-10-31T06:00:00.160352+00:00", "2020-10-31T06:00:00.260268+"2020-10-31T06:00:00.360184+00:00", "2020-10-31T06:00:00.460100+00:00", "2020-10-31T06:00:00.560016+00:00", "2020-10-31T06:00:00.659932+00:00", "2020-10-31106: 00: 00.759848+00: 00"],
"value s":
[7.878129,7.694595,7.670063,7.670292,7.655759, 7.637051,7.68 6231,7.643236]
}
Brushing A brushing request can be made via a POST to the brush endpoint. It can include a JSON payload that looks like:
{"device": "b2db25fd-a0b3-5407-98f2-e487a209031c",
"data": [[0.0, 1606608000000],
[0.004363309284621859, 1606608060000],
[0.00872653549812452, 1606608120000],
[0.013089595570970333, 1606608180000],
[0.017452406436784737, 1606608240000]],
"tsid": "brushed_temp"}

The format of the data is a set of pairs, consisting of [value, timestamp], where "timestamp" is the Unix timestamp in milliseconds. The value can be a 64-bit floating point value.

The POST can be made to, e.g.
curl-XPOST-H "x-functions-key: <key>"--header "Content-Type: application/json"--data @brush.json http://
Data brushed into the database management system can be available for query immediately. Caching may mean there is a 2-minute delay.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A database management system comprising:
computer-readable media having memory, one or more processors, and instructions stored in the memory that, when executed by the one or more processors, cause the one or more processors to:
generate an archive container, a cooked container, an ingest container, and an index container;
receive, in the ingest container, a plurality of time series data elements as input;
identify, in the ingest container, a data format for each of the plurality of time series data elements;
divide, in the ingest container, the plurality of time series data elements into a plurality of data sub-elements based on a corresponding append binary large objects (blobs) contained in the cooked container;
generate, in the ingest container, statistical data for the plurality of time series data elements for each of one or more index blobs contained in the index container; and
output, from the ingest container:
the statistical data to the index container;
the plurality of data sub-elements to the cooked container, and
the plurality of time series data elements to the archive container.

2. The database management system of claim 1, wherein the instructions are further executable to:
generate the statistical data based on a predefined time cycle.

3. The database management system of claim 1, wherein the statistical data comprises a minimum value within the plurality of time series data elements, a maximum value within the plurality of time series data elements, a mean value of the plurality of time series data elements, a count value of the plurality of time series data elements, or a combination thereof.

4. The database management system of claim 1, wherein the statistical data comprises data corresponding to a data type of the respective index blob.

5. The database management system of claim 1, further comprising:
a query application programming interface adapted or configured to:
transmit a query corresponding to data stored in the archive container, the cooked container, the index container, or a combination thereof, to the respective archive container, cooked container, index container, or combination thereof; and
receive the requested data in response to the query.

6. The database management system of claim 1, wherein the plurality of time series data elements are received from one or more Internet of Things (IoT) devices.

7. The database management system of claim 1, wherein the plurality of sub-elements are stored in a columnar format.

8. The database management system of claim 1, wherein the plurality of sub-elements are stored in a compressed comma separated variables (CSV) format.

9. The database management system of claim 1, wherein the plurality of time series elements are stored in the archive container as raw data.

10. The database management system of claim 1, wherein the plurality of sub-elements each comprises time data and device identification data.

11. The database management system of claim 10, wherein each of the plurality of sub-elements is stored in the corresponding append blob based on the device identification data, the time data, or both.

12. The database management system of claim 1, wherein the archive container, the cooked container, and the index container comprise a data lake.

13. The database management system of claim 1, wherein the plurality of time series data elements are received non-chronologically.

14. The database management system of claim 1, wherein two or more of the plurality of sub-elements are stored simultaneously and independently from each other.

15. The database management system of claim 1, wherein data can be received non-chronologically, but immediately searchable.

\* \* \* \* \*